(12) United States Patent
Testerman et al.

(10) Patent No.: US 6,926,196 B2
(45) Date of Patent: Aug. 9, 2005

(54) TRIANGULAR SHIPPING CONTAINER

(75) Inventors: Clay Testerman, Yukon, OK (US);
Charles W. Burchfield, Minco, OK (US)

(73) Assignee: M-D Building Products, Inc., Oklahoma City, OK (US)

( * ) Notice: Subject to any disclaimer, the term of this patent is extended or adjusted under 35 U.S.C. 154(b) by 0 days.

(21) Appl. No.: 10/284,859

(22) Filed: Oct. 31, 2002

(65) Prior Publication Data

US 2004/0084513 A1 May 6, 2004

(51) Int. Cl.$^7$ ................................................. B65D 5/00
(52) U.S. Cl. .................. 229/198.2; 229/115; 229/103.2
(58) Field of Search .............................. 229/198.2, 115, 229/103.2, 103.3

(56) References Cited

U.S. PATENT DOCUMENTS

| | | | | |
|---|---|---|---|---|
| 2,985,353 A | * | 5/1961 | Force | 229/161 |
| 3,199,765 A | * | 8/1965 | Locke | 229/103.2 |
| 3,891,136 A | * | 6/1975 | Woeste | 229/115 |
| 5,873,517 A | * | 2/1999 | Lisbon | 229/198.2 |
| 6,315,123 B1 | * | 11/2001 | Ikeda | 206/434 |

* cited by examiner

*Primary Examiner*—Tri M. Mai
(74) *Attorney, Agent, or Firm*—Husch & Eppenberger, LLC; Grant D. Kang; H. Frederich Rusche

(57) ABSTRACT

The invention is a triangular shipping container that is easily closed, easily opened, and that is reusable. The container is formed from a cardboard sheet that is provided with a number of mating male and female tabs.

4 Claims, 3 Drawing Sheets

TRIANGULAR SHIPPING CONTAINER

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention relates generally to boxes used for shipping and storage and, more particularly, to triangular shipping boxes.

2. Related Art

Triangular shipping containers are made from cardboard and have a generally triangular cross-section. Examples of such boxes are that used by FedEx. A FedEx triangular shipping container is shown in FIGS. 1 and 2. In FIGS. 1 and 2, overlapping longitudinal sides of the container are adhesively attached to form a triangular body. The ends are closed by the use of a tab that is bent perpendicularly and inserted into a receiving slot to assume a position normal to the receiving slot.

Other triangular shipping containers use a series of straps, like tie wraps, to encircle the triangular cross-section. Several straps are used along the longitudinal length of the container/box to prevent the box from unraveling. The ends of such boxes use end caps that are stapled to the sides of the box.

All of the triangular shipping containers of the prior art commonly share the characteristic of becoming somewhat destroyed upon a fill opening of the box/container. For example, opening the FedEx box along the longitudinal length requires that the adhesive forces holding cardboard sides be overcome. In practice, the box is essentially destroyed as the adhesive forces are stronger, by necessity, than the cardboard material, resulting in ripping or tearing of the cardboard upon opening. In addition, a great deal of force must be exerted to "rip" the sides of the box apart.

Similarly, whenever staples are used for the end caps of triangular shipping containers, removal of the staples can destroy and disfigure the end of the box. In addition, the straps that encircle the triangular circumference of the box/shipping container must be cut and permanently destroyed. In short, it is a lot of bother and effort to open one of the boxes/shipping containers open, and often results in a box that cannot be reused.

There is a need in the art to provide a triangular shipping container that is reusable, and that can be easily opened.

SUMMARY OF THE INVENTION

It is in view of the above problems that the present invention was developed. The invention is a triangular shipping container that is easily closed, easily opened, and that is reusable. The container is formed from a cardboard sheet that is provided with a number of mating male and female tabs. The matching arcuate shapes of the male tabs and female cutouts are unique. In addition, the female cutout is further provided with paired scoring that provides easy closing and opening of the shipping container. It is noted that the angle of entry of the male tab relative to the plane of the female cutout is acute.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 2:
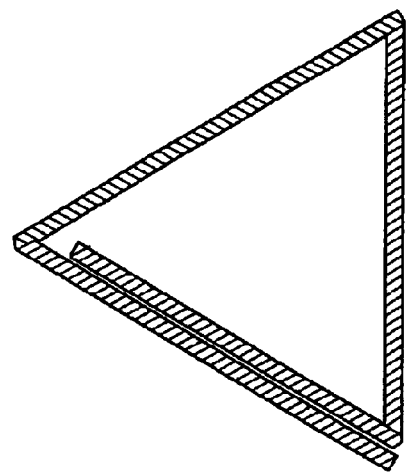
FIG. 2 illustrates a section view, taken along line 2—2 of FIG. 1.
Figure 1:
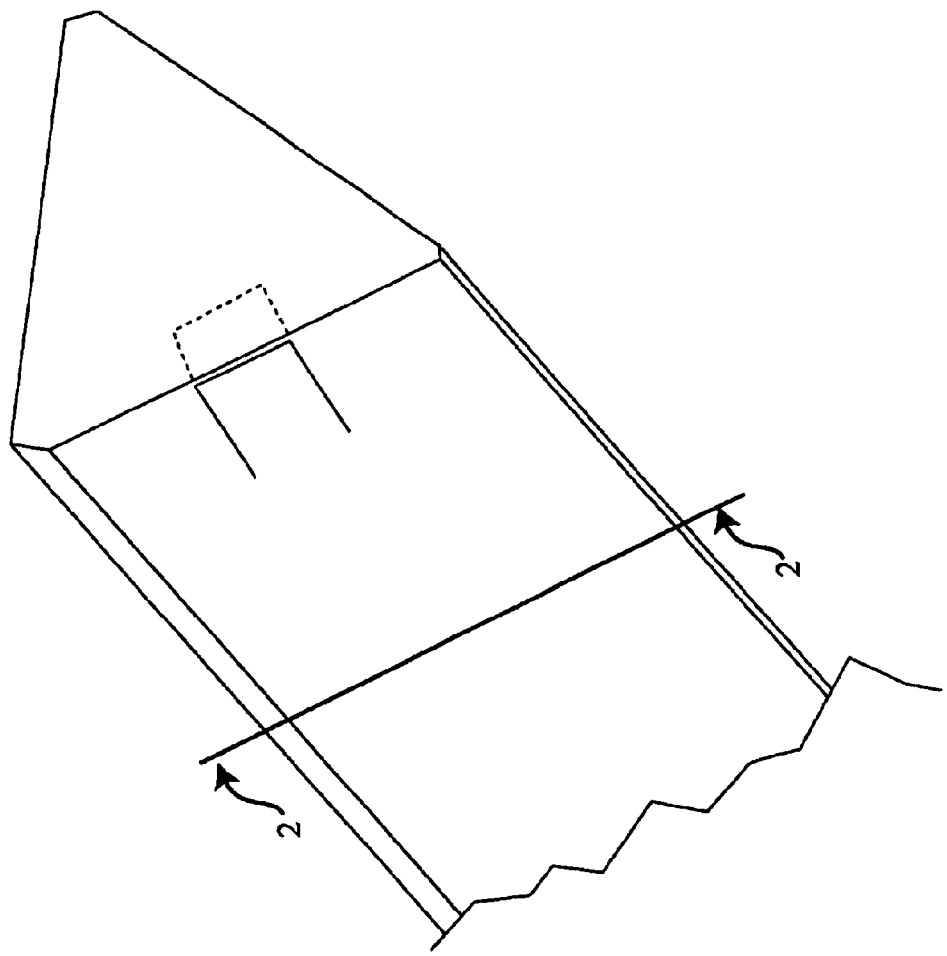
FIG. 1 is an elevated view of half of a shipping container/box of the prior art.
Figure 3:
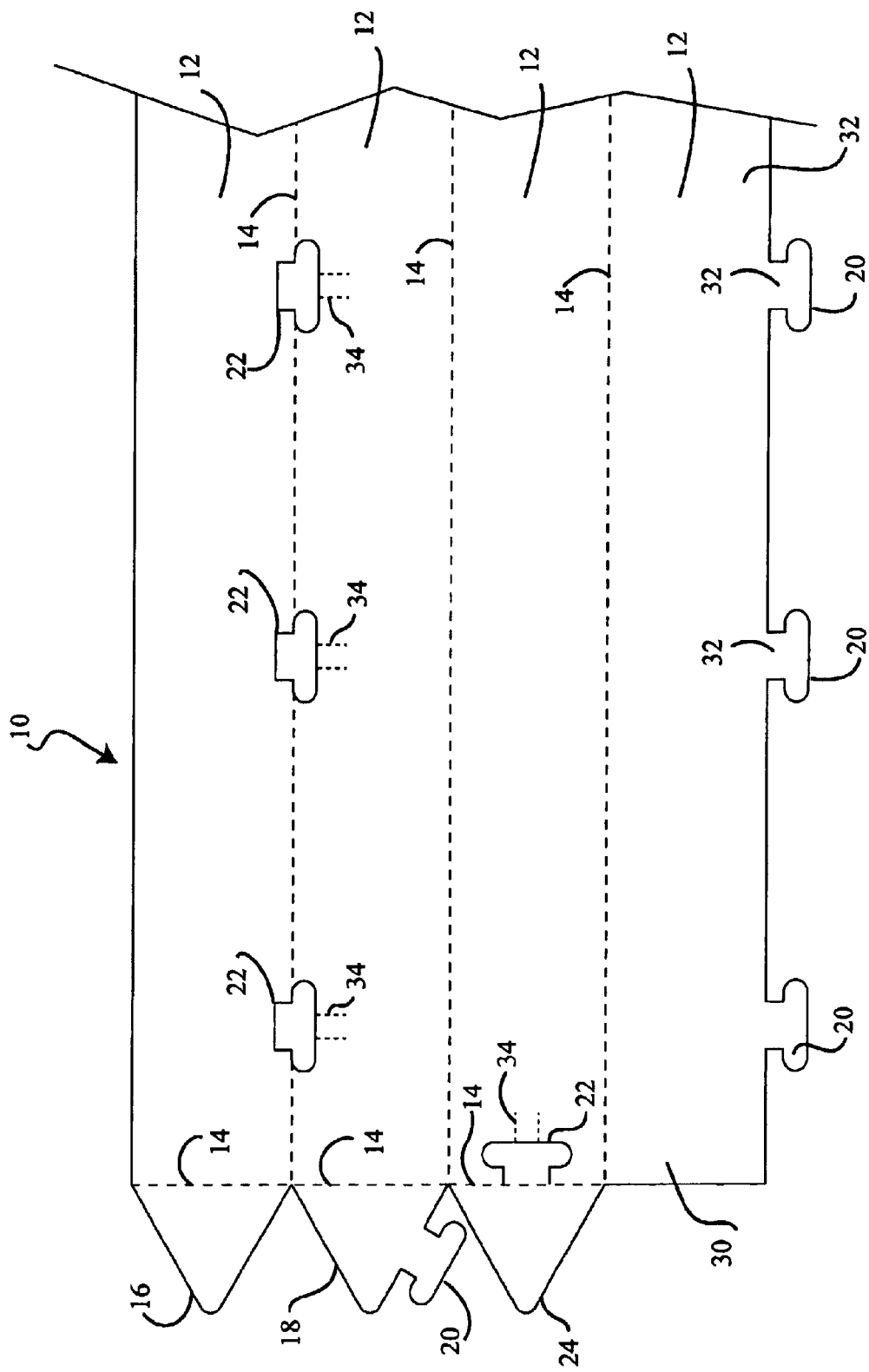
FIG. 3 illustrates a plan view the cardboard sheet of the present invention.

Referring to the accompanying drawings in which like reference numbers indicate like elements, FIG. 3 illustrates a plan view the cardboard sheet, shown generally at 10 of the present invention. Specifically, sheet 10 is provided with four longitudinal sides 12 separated by scored lines 14. Triangular end piece 16 is on one end, with a middle triangular end piece 18 provided with male tab 20 adapted for insertion into female cutout 22 located proximate interior triangular end piece 24. Preferably, male tab 20 has an arcuate area to accommodate the surface area presented by multiple fingers. Clipped end 30 of overlapping longitudinal section 32 helps to form an overlap of longitudinal sides 12 associated with triangular end piece 16, and is better shown in FIG. 4.

Figure 4:
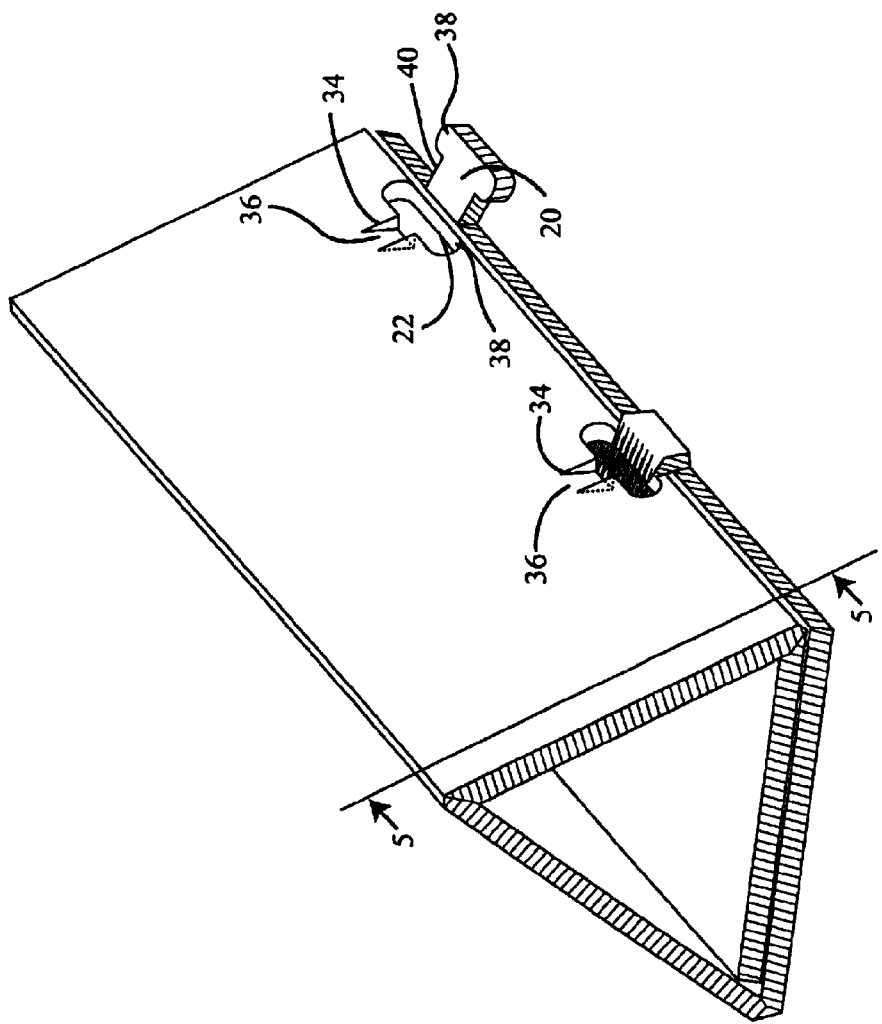
FIG. 4 illustrates an elevated, partial section view of a portion of the assembled container of the present invention that shows the mating of the male tab into the female cutout on the right side, and an unmated male-female pair on the left side.

Turning to FIG. 4, the left male tab 20 from overlapping longitudinal section 32 may be pushed into female cutout 22. Preferably, male tab 20 is wide to accommodate more than 1 finger (and preferably 3 or 4 fingers simultaneously) so that the force of repetitive closing will can be distributed across several fingers and not make any one finger uncomfortable.

Figure 5:
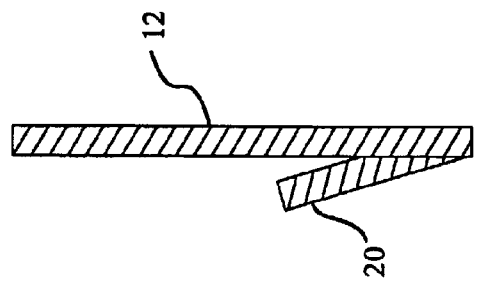
FIG. 5 illustrates a section view, taken along line 5—5 of FIG. 4, showing the relative angle between the male tab, and the side wall that accommodates the female cutout

Once inserted into female cutout 22, male tab 20 assumes an acute angle with respect to the plane of female cutout 22. This is best shown in FIG. 5. It has been found to be remarkably easy to push male tab 20 into female cutout 22. As also may be apparent from the drawings, the closure force exerted by male tab 20 originates from the base area, shown generally at 32, of male tab 20. This (acute angle, and base-originating closure force) provides a tremendous mechanical advantage over tabs used for closures in the prior art.

In order to extract male tab 20 from female cutout 22, there is, in the preferred embodiment, a pair of scored slits 34 is provided. The slits 34 permit a virtual tab 36 to be formed therebetween. Virtual tab 36 has one end that forms an edge portion of female cutout 22. This virtual tab 36 may be pulled away from longitudinal side 12 to form a space larger than that presented by female cutout 22, such space permitting the insertion of one or more fingers. Quite remarkable in the lack of effort required, the fingers may then easily pull male tab 20 out of female cutout 22. An identical operation is contemplated for the male tab 20 (associated with middle triangular end piece 18) in conjunction with female cutout 22 (associated with interior triangular end piece 24).

For extremely thick cardboard, it is preferred that the distance between male tabs be more than twelve inches and, preferably, thirteen and one-sixteenth inches.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A shipping container comprising,
  a. first, second, third and fourth longitudinal sides, joined serially and longitudinally;
  b. at least a first male tab disposed on said first longitudinal side, said male tab comprising a top section and a base section narrower than said top section;
  c. at least one female cutout disposed across said third and fourth longitudinal sides, said female cutout comprising a top section and a narrower base section having a substantially similar outline and dimensions as the top section and base section of the male tab; and
  d. a pair of slits in communication with said female cutout, wherein said pair of slits forms a virtual tab having one end that forms an edge of said female cutout.

2. A shipping container comprising,
  a. first, second, third and fourth longitudinal sides, joined serially and longitudinally;
  b. at least a first male tab disposed on said first longitudinal side, said male tab comprising a top section and a base section narrower than said top section;
  c. at least one female cutout disposed across said third and fourth longitudinal sides, said female cutout comprising a top section and a narrower base section having a substantially similar outline and dimensions as the top section and base section of the male tab; and
  d. wherein said top sections of said male tab and said female cutout are arcuate.

3. A shipping container comprising,
  a. a plurality of joined sides;
  b. at least one male tab disposed on one of the plurality of sides, said male tab comprising a top section and a base section narrower than said top section; and
  c. at least one female cutout disposed across two of the plurality of sides, said female cutout comprising a top section and a narrower base section having a substantially similar outline and dimensions as the top section and base section of the male tab; and
  d. a pair of slits in communication with said female cutout; wherein said pair of slits forms a virtual tab having one end that forms an edge of said female cutout.

4. A shipping container comprising,
  a. a plurality of joined sides;
  b. at least one male tab disposed on one of the plurality of sides, said male tab comprising a top section and a base section narrower than said top section; and
  c. at least one female cutout disposed across two of the plurality of sides, said female cutout comprising a top section and a narrower base section having a substantially similar outline and dimensions as the top section and base section of the male tab; and
  d. wherein said top sections of said male tab and said female cutout are arcuate.

* * * * *